Dec. 5, 1933.  J. H. ROBERTS  1,938,463
FRUIT JUICE EXTRACTOR
Original Filed March 11, 1932   3 Sheets-Sheet 1

James H. Roberts
INVENTOR
BY Victor J. Evans & Co.
ATTORNEY

Dec. 5, 1933.  J. H. ROBERTS  1,938,463
FRUIT JUICE EXTRACTOR
Original Filed March 11, 1932   3 Sheets-Sheet 2

James H. Roberts
INVENTOR

BY Victor J. Evans & Co.
ATTORNEY

Dec. 5, 1933.  J. H. ROBERTS  1,938,463
FRUIT JUICE EXTRACTOR
Original Filed March 11, 1932   3 Sheets-Sheet 3
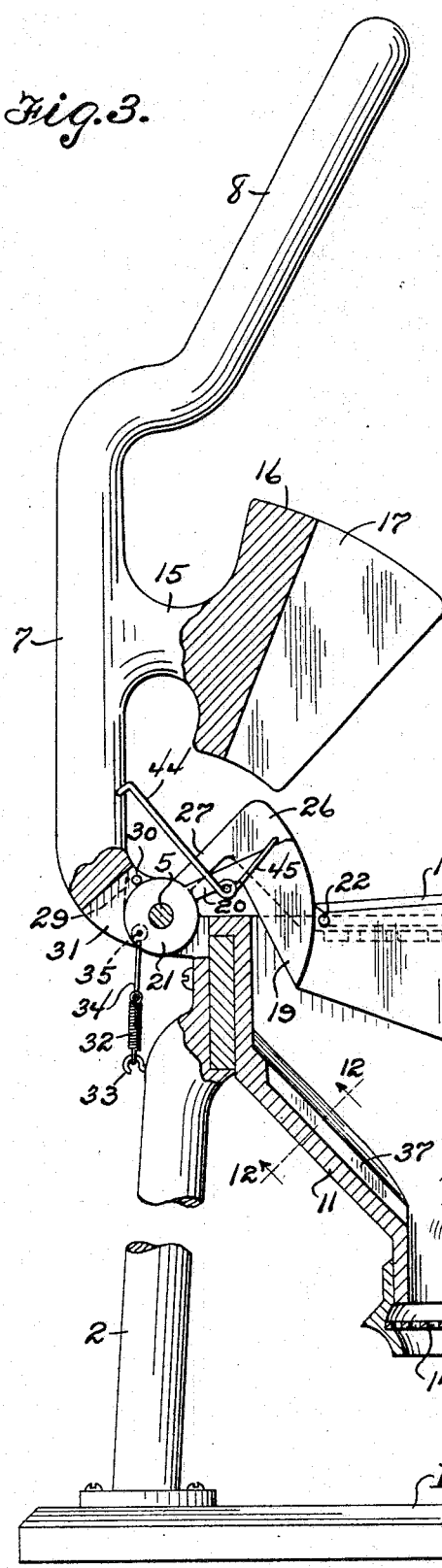
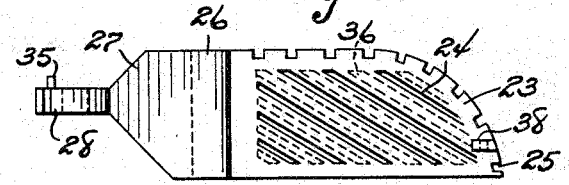
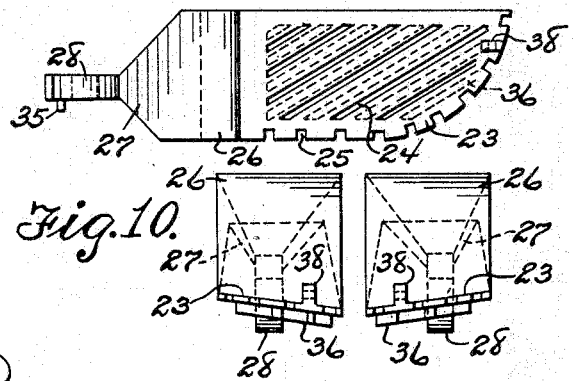
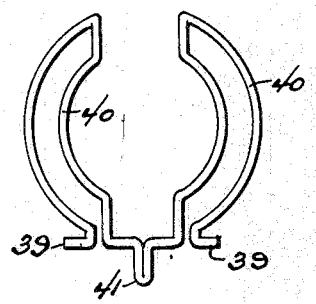
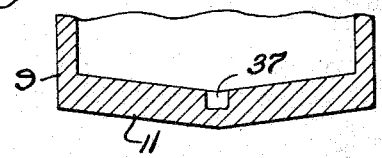
James H. Roberts
INVENTOR
BY Victor J. Evans & Co.
ATTORNEY Patented Dec. 5, 1933

1,938,463

UNITED STATES PATENT OFFICE 1,938,463

FRUIT JUICE EXTRACTOR

James H. Roberts, Park Ridge, Ill.

Application March 11, 1932, Serial No. 598,244
Renewed May 11, 1933

7 Claims. (Cl. 100—41)

This invention relates to fruit juice extractors, primarily designed for citrous fruits, and its general object is to provide a manually operated device of that character which simultaneously cuts and squeezes the fruit, strains the juice and ejects the rind from the device, by a single reciprocatory movement, with the result the entire juice contents of the fruit, free from seeds, pulp and foreign matter can be removed therefrom in an easy and expeditious manner and with very little effort.

A further object of the invention is to provide a fruit juice extractor, capable of performing the functions above set forth, that is simple in construction, inexpensive to manufacture and extremely efficient in operation and service.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 3 is a view somewhat similar to Figure 2, with the parts in open position.

Figure 9 is a top plan view of the elevators.

Figure 10 is a front view thereof.

Figure 11 is a detail view of the ejector.

Figure 12 is a sectional view taken approximately on lines 12—12 of Figure 3, looking in the direction of the arrows.

Figure 1:
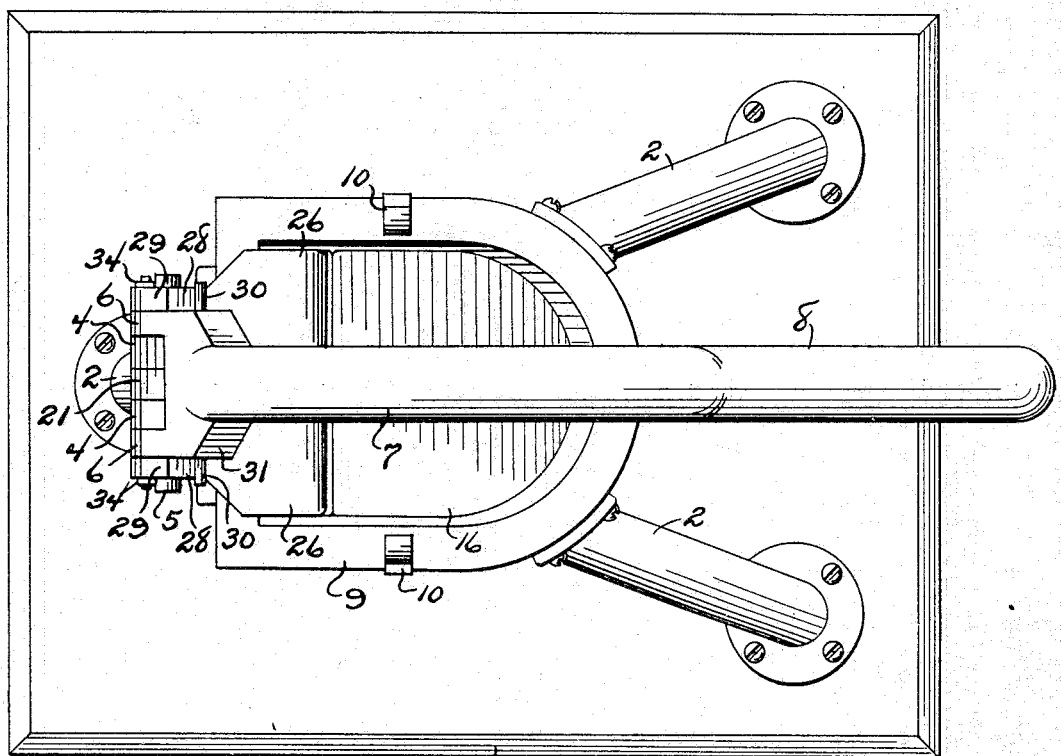
Figure 1 is a top plan view of the fruit juice extractor which forms the subject matter of the present invention.
Figure 4:
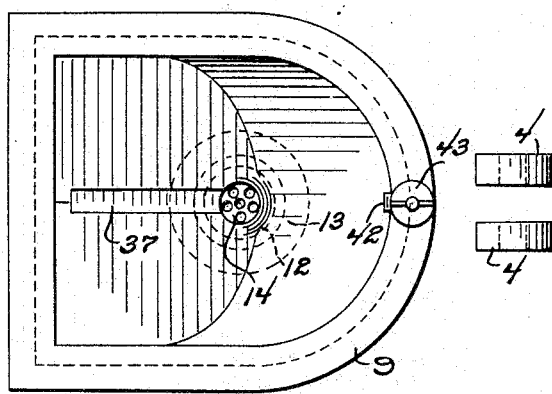
Figure 4 is a top plan view of the bowl.
Figure 5:
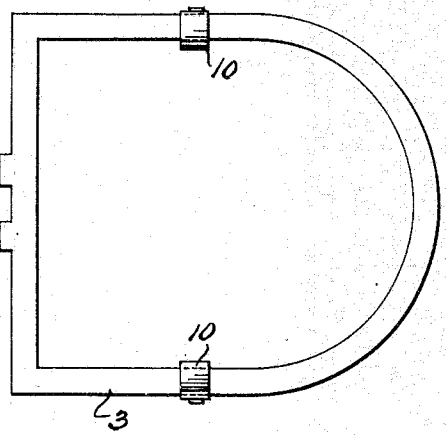
Figure 5 is a similar view of the body.
Figure 6:
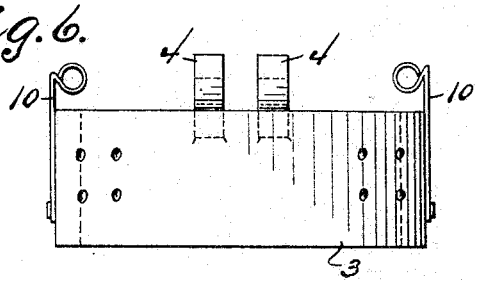
Figure 6 is a front view of the body.
Figure 2:
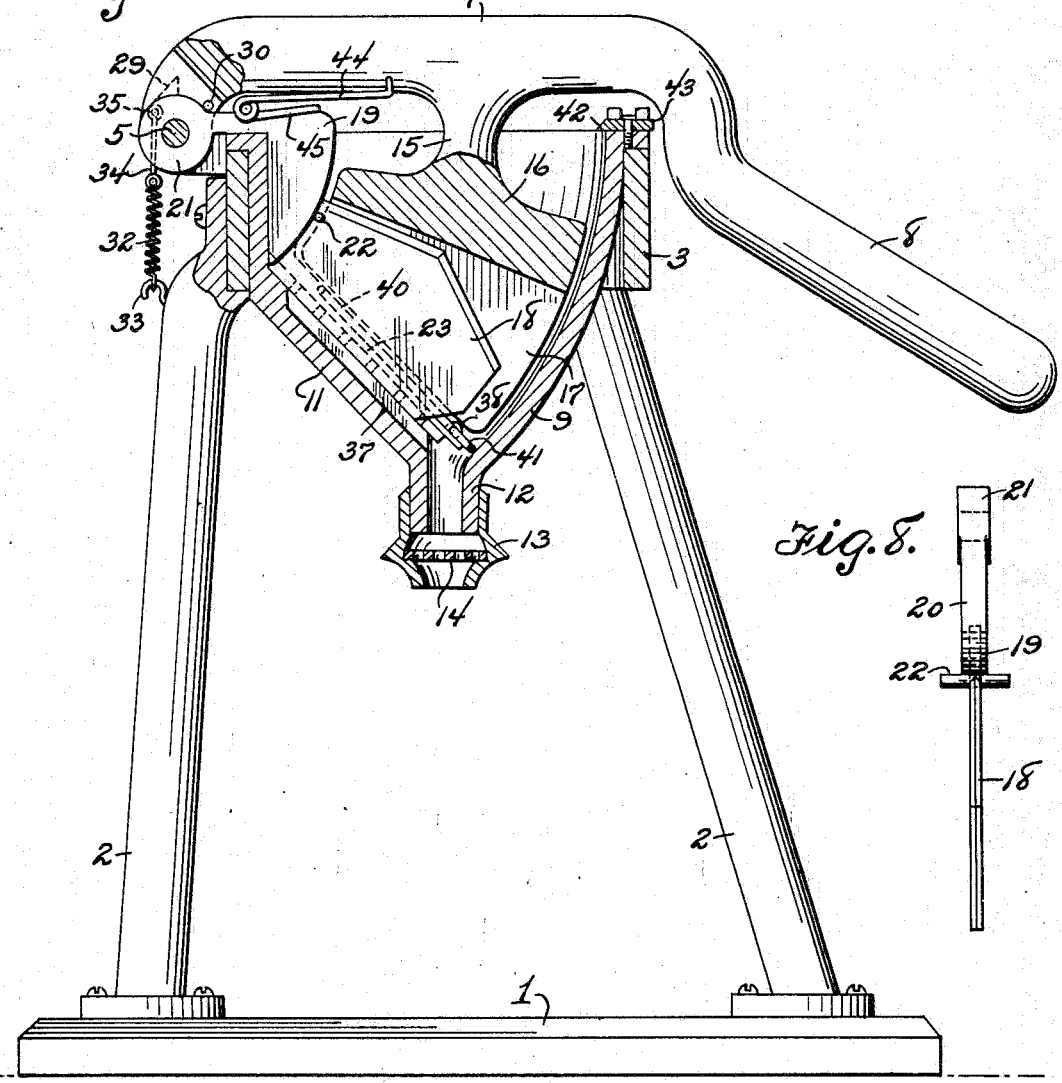
Figure 2 is a vertical sectional view taken through the device, with the parts disposed to operative or closed position.

Referring to the drawings in detail, the reference numeral 1 indicates the base of my device which has secured thereto and rising therefrom legs 2, the latter having secured to their upper ends the body 3, through the instrumentality of screw bolts as shown. While I have illustrated the body as having parallel sides, a curved front, and a straight rear wall, I want it understood that the body and its associated elements can be of different shapes without departing from the spirit of the invention, but in any event the body has formed with the straight rear wall thereof, a pair of spaced parallel ears 4 which are provided with openings to accommodate a pivot pin 5 which also passes through spaced parallel ears 6 that are formed with the plunger lever 7 which has its forward portion inclined downwardly to provide the handle 8 of the device as will be apparent.

The ears 6 are disposed on the outer sides of the ears 4, and from this construction it will be obvious that the plunger lever is pivotally secured with respect to the body.

Removably received within the body is a bowl 9 that is provided with a flange formed with the upper edge thereof to be disposed upon the upper edge of the body as best shown in Figure 3 and the bowl is held accordingly through the instrumentality of leaf springs 10 that have their upper ends rounded upon themselves for engagement with the upper end of the bowl which of course is of a shape to snugly fit within the body, but extends a considerable distance below the same. The bowl is provided with downwardly curved forward and side portions, while the rear portion is vertical for a portion of its length and then extends forwardly at an inclination as at 11. The forward, side and inclined portions of the bowl merge into a tubular spout 12 that has frictionally secured thereto a strainer 13, the latter being provided with an apertured disk 14, for the passage of the fruit juices therethrough.

Secured to the plunger lever through the instrumentality of a neck 15 is a plunger 16 which is provided with curved side walls to fit within the bowl 9 and an inclined bottom. The plunger has extending transversely thereof a slot 17 for the purpose of receiving the knife blade 18 of the knife member, and the knife blade is secured to the enlarged portion 19 of a shank 20 which has formed therewith a barrel 21 received between the ears 4 and through which passes the pivot pin 5.

Figure 8:
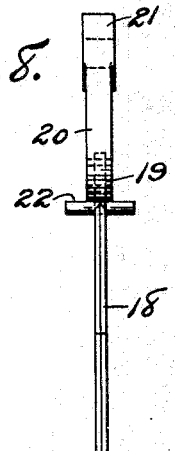
Figure 8 is a detail view of the knife member.
Figure 7:
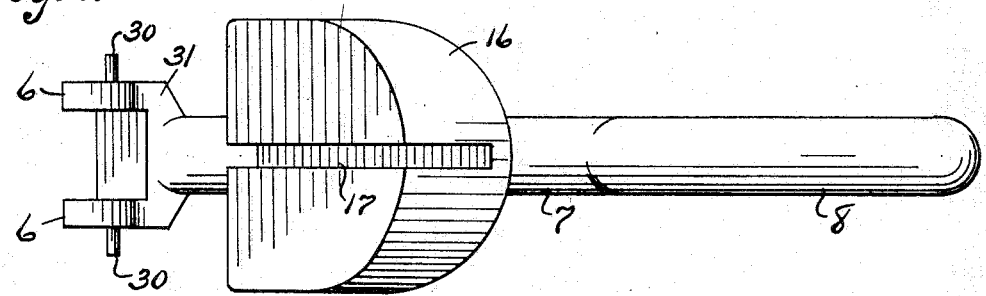
Figure 7 is a bottom plan view of the plunger and operating handle of the device.

The enlarged portion is arranged at right angles with respect to the shank 20 so as to allow for the movement of the knife blade within the bowl 9, and arranged at the juncture of the knife blade with the enlarged portion 19 is a pin 22 that extends upon opposite sides of the blade as best shown in Figure 8.

Disposed upon opposite sides of the knife blade 18 are the elevator members of my device and these elevator members are identical in construction as will be noted upon inspection of Figure 9.

The elevator members include substantially flat portions 23 that are provided with inclined slots 24 for the passage of the fruit juices therethrough and disposed about the outer edges of the flat portions are notches 25 for the same purpose as the slots 24. The outer edges of the flat portions of the elevators are shaped to fit the wall of the bowl and formed with the rear ends of the flat portions are enlarged upwardly inclined portions 26 that in turn have formed therewith shanks 27 arranged at right angles with respect thereto, and these shanks have formed therewith barrels 28 to be received by the pivot pin 5, the barrels of the elevators being disposed upon the outer sides of the ears 6 of the plunger lever 7 as clearly shown in Figure 1.

The barrels 28 have formed therewith lugs 29 and arranged in the path of these lugs 29 are studs 30 which extend from the opposite sides of the head 31 of the plunger lever 7. The lugs 29 are engaged by the studs 30 for the purpose of raising the elevators upon the upward movement of the plunger lever 7, and the elevators are independently raised or urged to an upward position through the instrumentality of a spring member which includes a coil spring 32 that has one of its ends secured to a hook 33 which extends from one of the legs 2. The coil spring has secured to its upper end the bright portion of a substantially U-shaped member, the arms 34 of which terminate in eyes that are received by studs 35 extending from the outer sides of the barrels 28.

The underside of the flat portions 23 of the elevators are provided with ribs 36 for the purpose of forming grooves for the passage of the fruit juices when the elevators are disposed in contacting engagement with the inclined rear portion of the bowl 9, and it will be noted that this inclined rear portion has arranged therein a channel groove 37 that is directed toward the tubular spout 12 as best shown in Figure 3. The rear portion of the bowl 9 is not only inclined forwardly, but the portions thereof upon opposite sides of the channel groove 37 incline downwardly toward the groove as shown in Figure 12.

Rising from the forward portions of the elevators adjacent the inner or confronting sides thereof are apertured lugs 38 which pivotally receive the trunnions 39 of an ejector that is formed from a single strand of resilient wire in a manner to provide curved arms 40 which have their upper ends disposed in spaced relation with respect to each other as clearly shown in Figure 11. The ejector has extending midway between its pivoted end a tongue 41, and arranged in the path of the tongue for the purpose of disposing the ejector to a vertical position as shown in Figure 3, is a lug 42 of a latch disk 43, the latter being rotatably mounted on the flange at the forward portion of the bowl, and provided with finger pieces whereby the lug can be disposed out of the path of the tongue 40 when desired.

The knife member is spring pressed, and for this purpose I provide a wire spring which includes arms 44 having bent ends engageable with the plunger lever 7, and arms 45 which have bent ends engageable with the enlarged portion 19 of the knife member as clearly shown in Figure 3, and at the juncture of these arms, the spring wire is coiled upon itself to set up a resilient action.

From the above description and disclosure of the drawings, it will be obvious that I have provided a fruit juice extractor that is capable of cutting, squeezing and straining the juice from the fruit as well as ejecting the rind from the device, and in the operation of my device, the parts are disposed to a position as shown in Figure 3, but with the ejector arranged in contacting engagement with the elevator members. A citrous fruit, such as oranges, lemons or the like is disposed on top of the ejector, the plunger is then moved downwardly through the instrumentality of the handle 8, and this movement will cause the knife blade to be passed through the fruit, and at the same time the fruit is being pressed between the portions of the plunger upon opposite sides of the slot 17 and the bowl, as the blade member, elevators and ejector are lowered by the pressure of the fruit against the same and this pressure cuts the fruit in halves, with the result the entire juice contents is extracted from the fruit for passage through the tubular spout 12 and strainer 13. Upon upward movement of the handle, the plunger will be moved accordingly to remove the pressure, and as the spring member which includes the coil spring 32 is connected to the barrels 28 of the elevator members, the elevator members will be raised immediately upon the raising of the plunger 16, and with sufficient force to cause the tongue 41 to strike the lug 42 so as to give the ejector sufficient force to spring upwardly or to the position as shown in Figure 3 for removing the rind from the elevator members. The elevator members are held in raised position through the instrumentality of the studs 30 and lugs 29, and it will be noted that when the handle 8 is disposed to its raised position, the studs 30 engage the lugs 29, and the elevator members hold the knife member in raised position by the engagement of the pin 22 of the knife member with the upper portions of the elevator members as best shown in Figure 3, so that the elevator members will lift the knife member and hold the same in operative position as shown and against the pressure of the spring member which includes the arms 44 and 45. This spring member also has a tendency to aid in lifting the plunger 16 as well as hold the plunger in raised position.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. In a fruit juice extractor, a body, a bowl removably associated with said body, a lever pivotally secured to said body, a plunger carried by the lever, a knife member cooperating with the plunger to cut and press fruit simultaneously, means for elevating the fruit rind, and ejector means for said rind.

2. In a fruit juice extractor, a body, a bowl removably associated with said body, a plunger lever including a handle and pivotally secured to said body, a plunger provided with a slot extending centrally therethrough, a spring pressed knife member pivotally secured to said body and including a blade movable into said slot and for cooperation with the plunger to simultaneously cut and press fruit, elevating means including members disposed upon opposite sides of the blade for elevating fruit rind, means pivotally secured to the elevator members for ejecting fruit rind therefrom, means secured to the bowl for operating the ejecting means, and straining means detachably secured to said bowl.

3. In a fruit juice extractor, a base, legs secured to and rising from said base, a body secured to the upper end of said legs, a bowl removably secured in said body, a plunger lever including a handle pivotally secured to said body, a spring pressed knife member pivotally secured to said body and including a blade, a slotted plunger receiving said blade in the slot thereof for cooperation with the plunger to simultaneously cut and press fruit, spring pressed elevator means including members disposed upon opposite sides of the blade, means connecting the elevator members and knife member to raise the latter against the pressure of its spring, ejecting means pivotally secured to the elevator members and means included in said ejecting means and secured to the bowl for operating the ejecting means.

4. In a fruit juice extractor, an elevated bowl, straining means associated with said bowl, a plunger, a knife member movable in said bowl and including a blade cooperating with said plunger to simultaneously cut and press fruit, elevator means movable in said bowl and including elevator members disposed upon opposite sides of the knife member, said members being provided with slots and notches for the passage of juice therethrough, means to space the elevator members from the bottom of the bowl, spring means for raising the elevator means, means for holding the elevator means in raised position means connecting the elevator means and knife member to raise and hold the latter in raised position, and rind ejecting means secured to the elevator means.

5. In a fruit juice extractor, means including a plunger and a knife member to simultaneously cut and press fruit, elevating means for receiving the fruit prior to being cut and pressed and for elevating the fruit rind, an ejector including trunnions pivotally secured to the elevating means and being adapted to eject rind therefrom, a tongue formed with the ejector and means arranged in the path of the tongue to actuate said ejector to operative position.

6. A fruit juice extractor comprising a base, legs secured to and rising from said base, a body secured to the upper end of said legs, a bowl removably associated with said body, a plunger lever pivotally secured to said body and including a handle, a neck formed on said plunger lever, a slotted plunger formed on said neck, a knife member including an enlarged portion, a shank formed on said enlarged portion, pivot means for said shank, a blade secured to said enlarged portion and movable into the slot of the plunger for cooperation with the latter to simultaneously cut and press fruit, spring means for the knife member and plunger lever respectively and including arms engageable therewith, elevating means including members disposed upon opposite sides of the knife member, pivot means for the elevator members, said knife member and elevator members being movable into the bowl, means for raising the elevator members from said bowl and including a spring having connection with one of the legs, means for connecting the spring to the elevator members, means for holding the elevator members in raised position and including lugs formed on the elevator members, studs secured to the plunger member and being engageable with the lugs, means connecting the elevator members and knife member for raising and holding the latter in raised position, fruit rind ejecting means secured to the elevator members and fruit juice straining means secured to said bowl.

7. In a fruit juice extractor, a bowl having a juice channel, cooperating means for simultaneously cutting and pressing fruit and movable into said bowl, elevating means for fruit rind and the cutting means, said elevating means being provided with juice passages, means for spacing said elevating means from the bottom of the bowl, ejector means for the fruit rind pivotally secured to said elevating means, and straining means for said bowl.

JAMES H. ROBERTS.